United States Patent [19]
Werber

[11] 4,302,570
[45] Nov. 24, 1981

[54] REACTIVE PLASTICIZER FOR ANAEROBIC ADHESIVES

[75] Inventor: Gerhardt P. Werber, Naperville, Ill.

[73] Assignee: Eschem Inc., Chicago, Ill.

[21] Appl. No.: 930,049

[22] Filed: Aug. 1, 1978

[51] Int. Cl.$^3$ ............... C08F 218/14; C08F 218/18; C08F 220/12
[52] U.S. Cl. ............................. 526/320; 260/42.15; 560/127
[58] Field of Search ......................... 526/320

[56] References Cited
PUBLICATIONS

CA, 77, 49432w, (1972).
CA, 78, 17020Q, (1973).
CA, 80, 84373m, (1974).
CA, 81, 4439v, (1974).

Primary Examiner—Stanford M. Levin

[57] ABSTRACT

Non-terminal hydroxy diesters of unsaturated dicarboxylic acids or anhydrides are used to plasticize acrylic monomers containing internal chain unsaturation in anaerobic adhesive systems.

3 Claims, No Drawings

REACTIVE PLASTICIZER FOR ANAEROBIC ADHESIVES

This invention relates to non-terminal hydroxy containing diesters of unsaturated dicarboxylic acids useful as plasticizers in anaerobic systems and especially those systems wherein organic imides are utilized as promoters.

The inhibiting effect of oxygen to the cure of acrylic monomers has been known for many years. This apparently adverse condition was transformed into something potentially valuable by the invention in U.S. Pat. No. 2,628,178 wherein a highly reactive monomer was prepared by bubbling air through a heated and agitated polyether glycol dimethacrylate ester, so as to form peroxides in the monomer chain. The oxygenated ester monomer remained liquid as long as aeration continued, but polymerized to a solid when aeration was discontinued. Unfortunately, this system had little commercial value due to the inherent problems of keeping the monomer fluid by aeration.

Thereafter, in U.S. Pat. No. 2,895,950, a chemical solution to the problem of keeping the dimethacrylate monomer from solidifying without aeration was set forth. It was disclosed that, by adding a hydroperoxide, the dimethacrylate ester could be cured (polymerized) at room temperature by placing the mixture between steel plates. On the other hand, when stored in a glass or plastic container, sufficient oxygen from the air in the head space diffused into the acrylic liquid, and kept it from polymerizing.

Since certain metal ions act as catalysts in decomposing the hydroperoxides, enabling commercially feasible cure times, most of the market for anaerobic adhesive had developed in bonding metal to metal. For example, anaerobic adhesives are used as (1) thread locking compounds which prevent loosening caused by vibration, (2) sealing compounds for threaded, flanged and sleeved joints to retain fluids and prevent leaking, (3) retaining compounds to bond parts having cylindrical symmetry such as gears or pulleys onto shafts, and (4) bonding compounds which serve as structural adhesives.

Generally, depending upon the ultimate use of the anaerobic adhesive, these adhesives should have high shear strength, good hot strength, and fast cure speed. Some prior art anaerobic monomers, and mixtures thereof, tend to exhibit some of these important characteristics, but not all simultaneously. For example, prior art monoacrylate monomers, such as hydroxyethyl methacrylate, cure quite rapidly yielding an adhesive exhibiting excellent shear strength, but relatively poor hot strength. Furthermore, prior art polyacrylate monomers, containing two or more acrylate groups, such as ethylene glycol dimethacrylate or trimethylolpropane trimethacrylate, exhibit good hot strength, but relatively poor shear strength. Also, several recent Japanese patents disclose anaerobically curing acrylic monomers prepared by the reaction of phthalic anhydride with mono or diacrylates. See Japanese patent Nos. 73/89,947, 73/9460 and 71/31,680. These monomers, however, do not simultaneously exhibit excellent shear strength and hot strength.

As is known in the art, polymerization of acrylic monomers can be accelerated by incorporation of promoters in the anaerobic adhesive composition. Further, plasticizers can be used to soften the polymerized methacrylate. Ordinarily, if one wishes to plasticize a polymerized methacrylate with a reactive monomer, one would select a methacrylate ester of a long chain aliphatic alcohol such as stearyl methacrylate or lauryl methacrylate. Unfortunately, these monomers have very little ability to dissolve o-benzoic sulfimide, an important polymerization promoter for anaerobic adhesives.

In view of the foregoing, there is a continuing need in the anaerobic adhesive art for improved plasticizers and improved adhesive systems. Accordingly, it is a principal objective of the present invention to provide improved reactive plasticizers for use in anaerobic adhesive systems.

It is also an object of the present invention to provide plasticizers that have the ability to dissolve promoters used in anaerobic adhesive systems.

The objectives of this invention are carried out by providing reactive non-terminal hydroxy diesters of unsaturated organic dicarboxylic acids or anhydrides. The non-terminal hydroxy group is desired to solubilize benzoicsulfimide while the unsaturation is useful for subsequent polyermization. The diesters are usually formed by reacting a fatty alcohol or fatty alcohols having non-interferring substituents with an unsaturated dicarboxylic acid followed by reaction with a glycidyl ether. The composition can be represented by the formula:

wherein R is aryl, or an aliphatic hydrocarbon radical, usually alkyl of about 1-22 carbons and usually about 6 to about 22 carbons, A is the internal unsaturation portion of an unsaturated dicarboxylic acid and R' is a hydroxy containing radical usually hydrocarbon or oxygen hydrocarbon such as an ether of 2 to 22 carbons. Examples include alkoxy, aryloxy, or aryl substituted aliphatic radicals of 2 to 22 carbons.

Fatty alcohols and aromatically substituted aliphatic alcohols utilized are those containing about 1 to 22 carbons and representative examples are hexyl alcohol, octyl alcohol, dodecyl alcohol, octadecyl alcohol, benzyl alcohols, cyclohexanols, etc., and their isomers. Unsaturated fatty alcohols are also contemplated and include oleic alcohol and linoleic alcohol.

The internal portion of the plasticizer is made from an unsaturated polycarboxylic acid or an unsaturated polycarboxylic acid anhydride. Typical unsaturated dicarboxylic acids include maleic, fumaric, itaconic and its isomers, allylmalonic and its isomers, allylsuccinic and its isomers, xeronic acids, and cetylmalonic acids. Because reaction with the acid anhydride proceeds much easier than reaction with the carboxylic acid, and because no by-products are formed, it is generally preferred to use the unsaturated acid anhydride. Although all unsaturated polycarboxylic acid anhydrides are envisioned within the scope of this invention, the unsaturated dicarboxylic acid anhydrides, in particular, comprise the most important reactants. Typical unsaturated acid anhydrides which may be utilized in the present invention include maleic anhydride, itaconic anhydride, tetrahydrophthalic anhydride, as well as the Diels-Alder reaction product of maleic anhydride and cyclopentadiene or methyl-substituted cyclopentadiene.

The third reactant is a monoepoxide wherein the oxirane oxygen is attached to adjacent carbons. They may be represented by the formula:

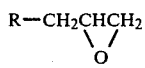

wherein R is alkyl, alkenyl, phenyl or an oxygen containing hydro-carbon radical of usually between about 2 to about 20 carbon atoms. Examples include: ethylene oxide, propylene oxide, butyl glycidyl ether, phenyl glycidyl ether, myristyl glycidyl ether, lauryl glycidyl ether, styrene oxide, etc.

In forming the reactive plasticizer of this invention, one mole of a fatty alcohol or mixture of fatty alcohols is reacted with the dicarboxylic anhydride at a temperature of between about 110° F. and about 120° F. for 2 to 3 hours. A mole of this half ester is then reactfed with a mole of an aliphatic mono-epoxide or mixtures of mono-epoxides at a temperature of between about 75° F. and 176° F. for 24 to 432 hours. In both steps, an amine such as triethyl amine can be used as a catalyst when forming the half ester.

When formulating the anaerobic system, the plasticizer will be present in amounts of about 5–80 parts plasticizer for 95–20 parts of acrylate monomer or polymer. The promoters are incorporated into the adhesive system in amounts of from about 0.01 to 10% by weight, and preferably about 1 to 10% by weight of the adhesive composition.

Promoters well known in the anaerobic adhesive art are the imide and formamide type. Exemplary of the various accelerators are benzoic sulfimide, succinimide, phthalimide, formamide, N-substituted formamides, such as N-ethyl formamide, and the metallic salts of the imides.

Of the various promoters, the sulfimides have proven to be most preferable in that they not only provide greatly accelerated curing characteristics but also enable the provision of compositions which exhibit excellent shelf stability over extended periods of time. Of the sulfimides, benzoic sulfimide has proven most beneficial. Compositions wherein amine accelerators are used in conjunction with the sulfimides are also contemplated.

The reactive plasticizers of this invention have special utility when used in formulation relating to polymerizable acrylic monomers and to adhesives containing such monomers. More particularly, the acrylic monomers are anaerobically polymerizable, that is, they cure in the absence of air.

Prior art acrylic monomers, are capable of free-radical initiated addition polymerization at the unsaturated acrylic double bonds in the absence of air. This addition polymerization, in the absence of air, is catalyzed by free-radical initiators such as perioxides and hydroperoxides, and in particular, thermally stable organic hydroperoxides such as tertiary butyl hydroperoxide and cumene hydroperoxide. Other hydroperoxides which are less stable but more reactive can also be used. The catalyst is generally included in the anaerobic adhesive composition in an amount of from about 0.01 to 10% by weight of the total adhesive composition, and preferably from about 0.5 to 5.0% by weight. The catalyst is generally ineffective to polymerize the monomer in the presence of oxygen, but will initiate addition polymerization when air is excluded.

Also, in accordance with established prior art procedures, polymerization of the acrylic monomers can be accelerated by incorporating promoters in the anaerobic adhesive composition. These promoters are teritary organic amines, imides, sulfimides or mixtures thereof, such as dimethyl aniline, dimethyl-p-toluidine and benzoic sulfimide. The promoters are incorporated in the adhesive composition in amounts of from about 0.01 to 10% by weight, and preferably from about 1to 10% by weight of the adhesive composition.

As is known in the art, anaerobic adhesives should be stabilized in order to prevent accidental polymerization induced by the presence of impurities that tend to catalyze polymerization of the acrylic monomer even in the presence of air. The addition of inhibitors such as quinones, e.g., benzoquinone, greatly prolongs the shelf-life of the adhesives. These inhibitors need be present in the adhesive composition in only very small amounts, usually from about 10 to 1000 parts per million (ppm), and preferably from about 50 to 300 ppm.

Many optional ingredients may be incorporated in the final adhesive formulation, depending on the properties desired. A viscosity control agent, such as fumed silica, may be added, usually in amounts of less than about 5%. Further, lubricants and dyes may be added, if desired.

It should also be understood that the anaerobic adhesive compositions useful in this invention may include a large variety of prior art acrylic monomers blended with other acrylic monomers described herein. Thus, the acrylic monomers may be blends of hydroxyethyl methacrylate, hydroxy propyl methacrylate, trimethylolpropane trimethacrylate, dibromo propyl methacrylate, tetraethylene glycol dimethacrylate, dipropylene glycol dimethacrylate, methyl methacrylate, ethyl methacrylate, propyl methacrylate, polyethylene glycol di-methacrylate, di(pentamethylene glycol) dimethacrylate, n-butyl methacrylate, trimethylolpropane triacrylate, tetraethylene glycol diacrylate, isobutyl methacrylate, tetraethylene glycol di-(chloroacrylate), diglycerol diacrylate, diglycerol tetramethacrylate, butylene glycol dimethacrylate, ethylene glycol dimethacrylate, neopentyl glycol diacrylate, and tetrahydrofurfural methacrylate. It wil be clear to those in the art that the above is only a partial list of available polymerizable acrylic monomers, and that all such known polymerizable acrylic monomers mayb be beneficially blended with the novel reactive plasticizers of this invention to form improved anaerobic adhesive systems.

The invention will be described further in connection with the examples set forth below which are for purposes of illustration only.

EXAMPLE I

To 39.8 g. maleic anhydride was added 89 g. of Procter and Gamble's CO 1214 (a fatty alcohol mixture of primarily $C_{12}$ and $C_{14}$ alcohols, hydroxy value of 285) in a clean, cool beaker and agitated with a magnetic stirrer. The mixture was heated to 50°–60° C. until all maleic anhydride was dissolved. Ten ml. of triethyl amine was added and the anhydride-alcohol reaction allowed to proceed for 2 hours. Then 121.2 g. of Procter and Gamble's Epoxide No. 8 (an aliphatic glycidyl ether mixture made up of primarily $C_{12}$ and $C_{14}$ alkoxy groups and having a typical weight per epoxide of 286) was added. Reaction of the epoxide group was carried out at 70°–80° C. for 48 hours until an acid value of 4.6 was obtained. The reaction product was allowed to cool to room temperature.

EXAMPLE II 63.7 g. maleic anhydride (0.65 mol), 22.8 g. (0.7125 mol) methyl alcohol and 193.9 g. Epoxide No. 8 was added to a covered jar equipped with a magnetic stirrer. The ingredients were agitated until the maleic anhydride dissolved and then 16 ml. of triethylamine was added. The contents were allowed to react for 18 days at room temperature until reaching an acid value of 30.

EXAMPLE III

In a manner similar to Example II, 95.5 g. (0.974 mols) of maleic anhydride was added to 213.6 g. of Alfol 1214 (a mixture of lauryl and myristyl alcohols), and then 16 ml. of triethyl amine was added with agitation. The reaction proceeded for two hours and then 58.8 g. (1.014 mols) of propylene oxide was added. The jar remained covered until an acid value of 12 was obtained after an 18 day reaction at room temperature.

EXAMPLE IV 115.7 g. (0.65 mols) methyl nadic anhydride 142.4 g. Alfol 1214 was added to a covered jar and agitated with a magnetic stirrer. 18 ml. of triethyl amine was added. After 2 hours of agitation, 193.9 g. of Epoxide No. 8 (a mixture of lauryl and myristyl glycidyl ethers) was added and the reaction allowed to proceed for 6 days at room temperature. The product had an acid value of 39.2. The reactants were then heated to 70° C. and agitation continued for 16 additional hours until the acid value reached 18.6.

EXAMPLE V

Four separate adhesive formulations were prepared by adding 60 g. of each of the four reactive plasticizers prepared in Examples I through IV to a mixture of 20 g. trimethylolpropane trimethacrylate and 20 g. hydroxyethyl methacrylate. Two other formulations were prepared by adding 60 g. each of isodecylmethacrylate and stearyl methacrylate to a mixture of 20 g. trimethylolpropane trimethacrylate and 20 g. hydroxethylmethacrylate. All samples were suitably stabilized, catalyzed with cumene hydroperoxide, thickened with 3 g. fumed silica and promoted with 3.5 g. of benzoic sulfimide. The benzoic sulfimide was insoluble in the formulations containing the isodecyl and stearyl methacrylates after 3 days agitation and these 2 formulations were discarded.

The reactive plasticizers of Examples I-IV dissolved the benzoic sulfimide and the adhesive formulations containing these plasticizers were placed between the mating portion of 6 clean, plain steel ⅜-24 threaded nuts and cap screws. The curing reaction was allowed to proceed for 72 hours at room temperature and the following breakaway and prevailing torque results were obtained:

| Adhesive Containing Plasticizer From Example: | Torque B/P (in pounds) Average |
|---|---|
| I | 19/4 |
| II | 14/4 |
| III | 17/5 |
| IV | 25/9 |

Obviously, many modifications and variations of the invention as hereinbefore set forth may be made without departing from the spirit and scope thereof, and therefore, only such limitations should be imposed as are indicated by the appended claims.

I claim:

1. As a novel composition of matter, a liquid anaerobically curable adhesive composition comprising an anaerobically, polymerizable acrylate, o-benzoic sulfimide as a promoter to accelerate polymerization and a reactive plasticizer which is a non-terminal hydroxy diester of the formula:

wherein R is aryl or an aliphatic hydrocarbon radical of about 1-22 carbons, $R^1$ is a hydroxy containing radical of about 2-22 carbons formed from a glycidyl ether and A is the remaining portion of an unsaturated dicarboxylic acid or anhydride, said composition having good shear and hot strength and shelf stability.

2. The composition of claim 1 wherein the plasticizer is present in the amount of about 5 to about 80 parts per 95 to 20 parts of the polymerizable acrylate.

3. The composition of claim 1 wherein A is the remaining portion of maleic anhydride.

* * * * *

UNITED STATES PATENT AND TRADEMARK OFFICE
CERTIFICATE OF CORRECTION

PATENT NO. : 4,302,570

DATED : November 24, 1981

INVENTOR(S) : Gerhardt P. Werber

It is certified that error appears in the above-identified patent and that said Letters Patent are hereby corrected as shown below:

Under "References Cited", should appear:

UNITED STATES PATENTS

| | | |
|---|---|---|
| 2,628,178 | 2/1953 | Burnett et al |
| 2,895,950 | 7/1959 | Krieble |
| 3,010,906 | 11/1961 | Signouret et al |
| 3,218,305 | 11/1965 | Krieble |
| 3,260,704 | 7/1966 | Slocombe |
| 3,300,547 | 1/1967 | Gorman et al |
| 3,406,221 | 10/1968 | Wright et al |
| 3,414,635 | 12/1968 | Edwards et al |
| 3,419,512 | 12/1968 | Lees et al |
| 3,794,610 | 2/1974 | Bachmann |
| 3,969,328 | 7/1976 | Kurz et al |

Column 1, line 35, "adhesive" should read --adhesives--.

Column 2, line 26, "non-interferring" should read --non-interfering--.

Column 3, line 19, "reactfed" should read --reacted--.

Column 3, line 57, "perioxides" should read --peroxides--.

UNITED STATES PATENT AND TRADEMARK OFFICE
CERTIFICATE OF CORRECTION

PATENT NO. : 4,302,570
DATED : November 24, 1981
INVENTOR(S) : Gerhardt P. Werber It is certified that error appears in the above-identified patent and that said Letters Patent are hereby corrected as shown below:

Column 4, line 4, "teritary" should read --tertiary--.

Column 4, line 46, "mayb" should read --may--.

Column 5, lines 42-43, "hydroxethylmethacrylate" should read --hydroxyethylmethacrylate--.

Signed and Sealed this

Sixteenth Day of March 1982

[SEAL]

Attest:

Attesting Officer

GERALD J. MOSSINGHOFF
Commissioner of Patents and Trademarks